US010780919B2

(12) United States Patent
Hisrich et al.

(10) Patent No.: US 10,780,919 B2
(45) Date of Patent: Sep. 22, 2020

(54) ASYMMETRICAL TRACK CRAWLER POSITIONING SYSTEM

(71) Applicant: Tadano Mantis Corporation, Franklin, TN (US)

(72) Inventors: Edward Hisrich, Franklin, TN (US);
Julie Fuller, Franklin, TN (US);
Carolyn Nayak, Franklin, TN (US);
Daniel Denney, Franklin, TN (US);
Hideyuki Sasaki, Takamatsu (JP);
Hiromasa Yamashita, Sakaide (JP)

(73) Assignee: Tadano Mantis Corporation, Franklin, TN (US)

( * ) Notice: Subject to any disclaimer, the term of this patent is extended or adjusted under 35 U.S.C. 154(b) by 333 days.

(21) Appl. No.: 15/867,424

(22) Filed: Jan. 10, 2018

(65) Prior Publication Data

US 2018/0194396 A1    Jul. 12, 2018

Related U.S. Application Data

(60) Provisional application No. 62/444,746, filed on Jan. 10, 2017, provisional application No. 62/466,892, filed on Mar. 3, 2017.

(51) Int. Cl.
*B62D 11/00* (2006.01)
*B66C 23/62* (2006.01)
(Continued)

(52) U.S. Cl.
CPC .......... *B62D 11/003* (2013.01); *B62D 11/183* (2013.01); *B62D 55/0845* (2013.01);
(Continued)

(58) Field of Classification Search
CPC .... B62D 11/003; B62D 11/183; B62D 55/20; B62D 55/0845; B62C 23/62; B62C 23/90; B62C 23/905
(Continued)

(56) References Cited

U.S. PATENT DOCUMENTS

| 3,749,193 A | 7/1973 | Blase et al. |
| 4,431,074 A | 2/1984 | Langerud |

(Continued)

FOREIGN PATENT DOCUMENTS

| CN | 102642508 | * 8/2012 | ............ B60R 16/02 |

OTHER PUBLICATIONS

Liebherr Brochure, "The Variable Supporting Base From Biebherr" Liebherr-Werk Ehingen GmbH, Printed in Germany by Tauss BK LWE p-411-02-e042016 (2016) (16 pages).

(Continued)

*Primary Examiner* — Tan Q Nguyen
(74) *Attorney, Agent, or Firm* — Procopio, Cory, Hargreaves & Savitch LLP

(57) ABSTRACT

A control system for a machine having a support structure, a track roller frame assembly coupled to the support structure and a machine body coupled to the support structure, the electronic control system including a lateral position sensor that is coupled to the track roller frame assembly and is configured to detect a lateral position of the track roller frame assembly relative to the support structure, an angular position sensor that is coupled to the machine body and is configured to detect an angular position of the machine body relative to the support structure, and a processor configured to determine a parameter for the tracked machine based on the detected lateral position of the track roller frame assembly, the detected lateral position indicative asymmetrical positioning a track roller frame assembly, and the detected angular position of the machine body, and provide feedback based on the parameter for the tracked machine.

17 Claims, 7 Drawing Sheets

(51) Int. Cl.
B62D 55/20 (2006.01)
B66C 23/90 (2006.01)
B62D 55/084 (2006.01)
B62D 11/18 (2006.01)

(52) U.S. Cl.
CPC .............. B62D 55/20 (2013.01); B66C 23/62 (2013.01); B66C 23/90 (2013.01); B66C 23/905 (2013.01)

(58) Field of Classification Search
USPC .......................................................... 701/50
See application file for complete search history.

(56) References Cited

U.S. PATENT DOCUMENTS

| | | | | |
|---|---|---|---|---|
| 6,176,334 | B1 | 1/2001 | Lorenzen | |
| 7,472,009 | B2* | 12/2008 | Baldwin | E02F 3/48 |
| | | | | 172/4.5 |
| 8,626,404 | B2* | 1/2014 | Thomson | E02F 9/2025 |
| | | | | 180/197 |
| 9,132,870 | B2 | 9/2015 | Smith et al. | |
| 2003/0127258 | A1* | 7/2003 | Lansberry | B62D 49/0635 |
| | | | | 180/9.36 |
| 2006/0085118 | A1* | 4/2006 | Baldwin | E02F 3/48 |
| | | | | 701/50 |
| 2009/0229894 | A1 | 9/2009 | Roucka | |
| 2012/0130599 | A1* | 5/2012 | Faivre | E02F 9/2033 |
| | | | | 701/50 |
| 2012/0173094 | A1* | 7/2012 | Steinich | B66C 23/78 |
| | | | | 701/50 |
| 2014/0020963 | A1 | 1/2014 | Smith et al. | |
| 2014/0107896 | A1* | 4/2014 | Fehr | E02F 3/845 |
| | | | | 701/50 |

OTHER PUBLICATIONS

Extended European Search Report for related EP App No. 18151082.7 dated May 14, 2018, 6 pgs.

* cited by examiner

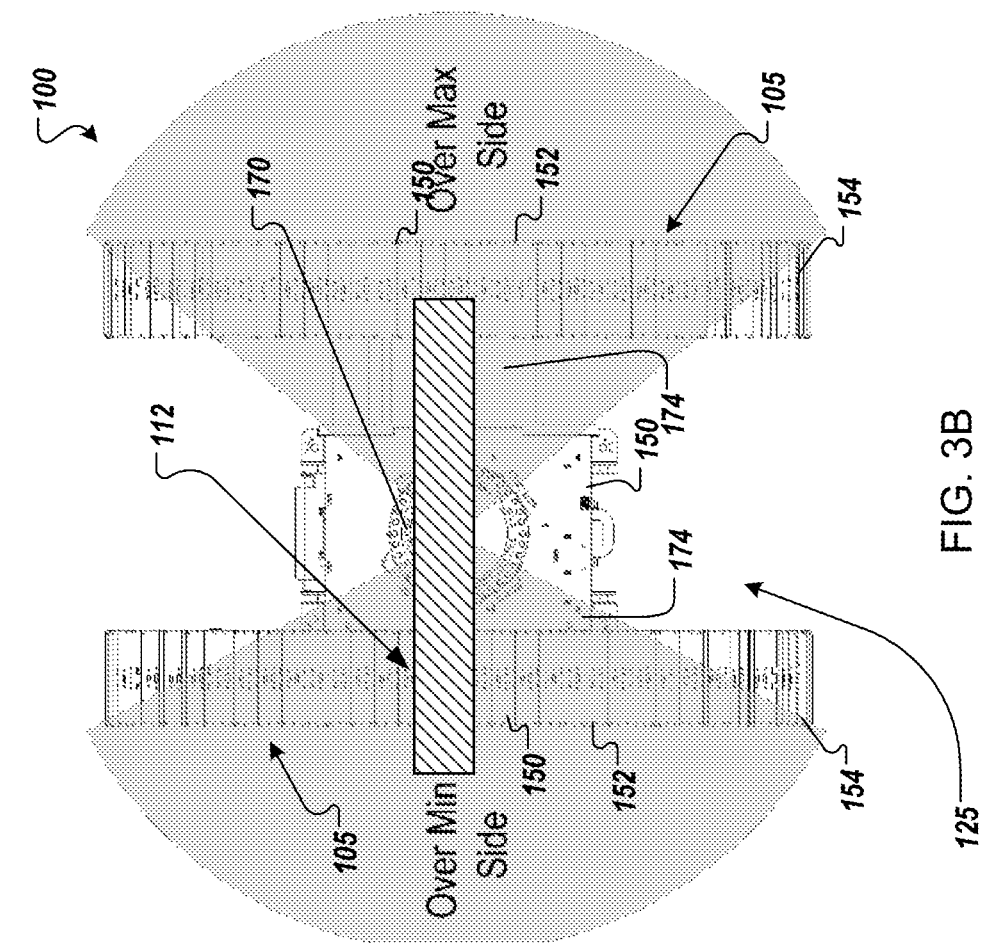
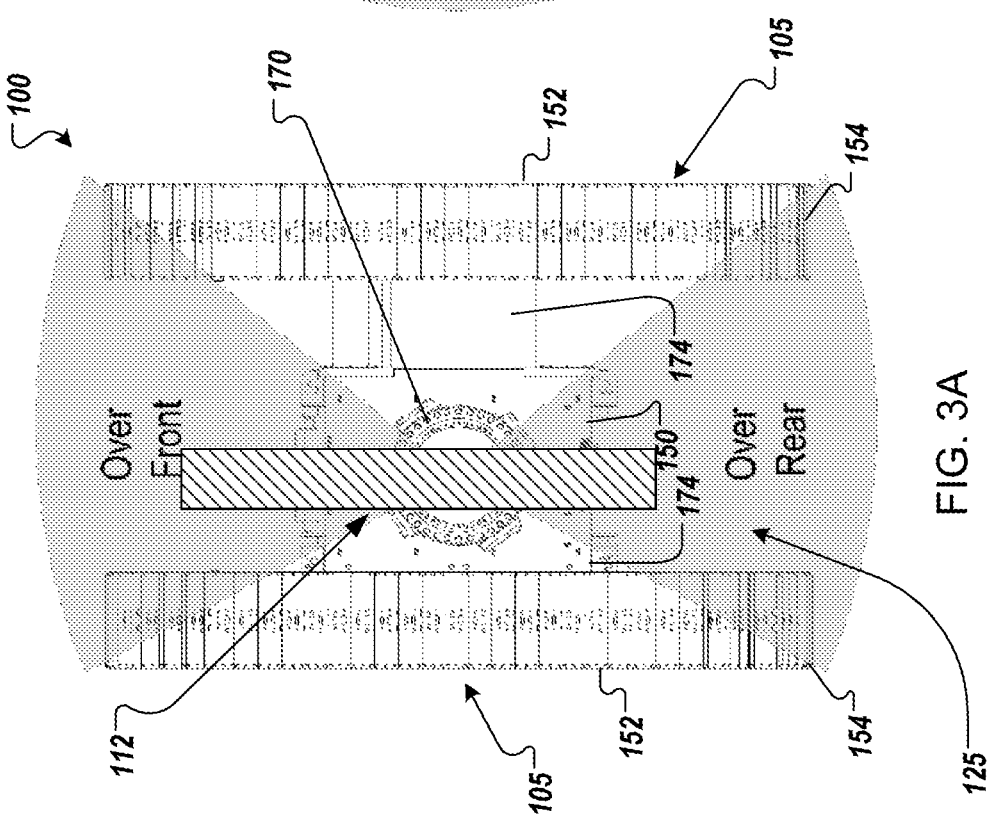
FIG. 3B
FIG. 3A

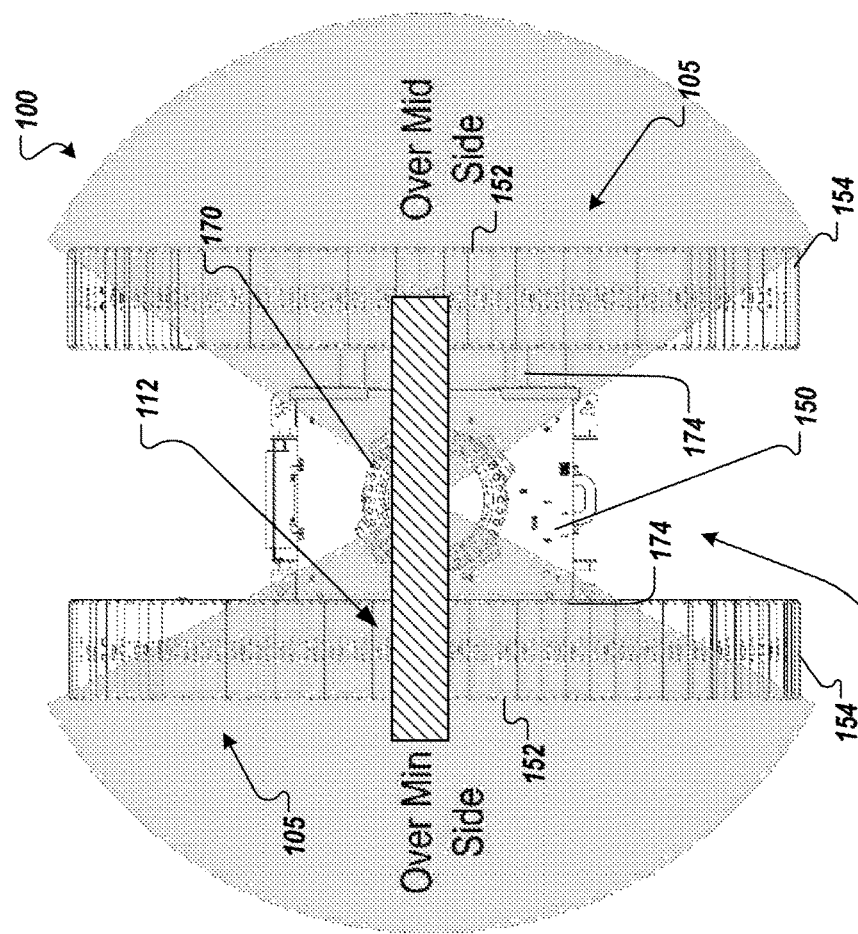
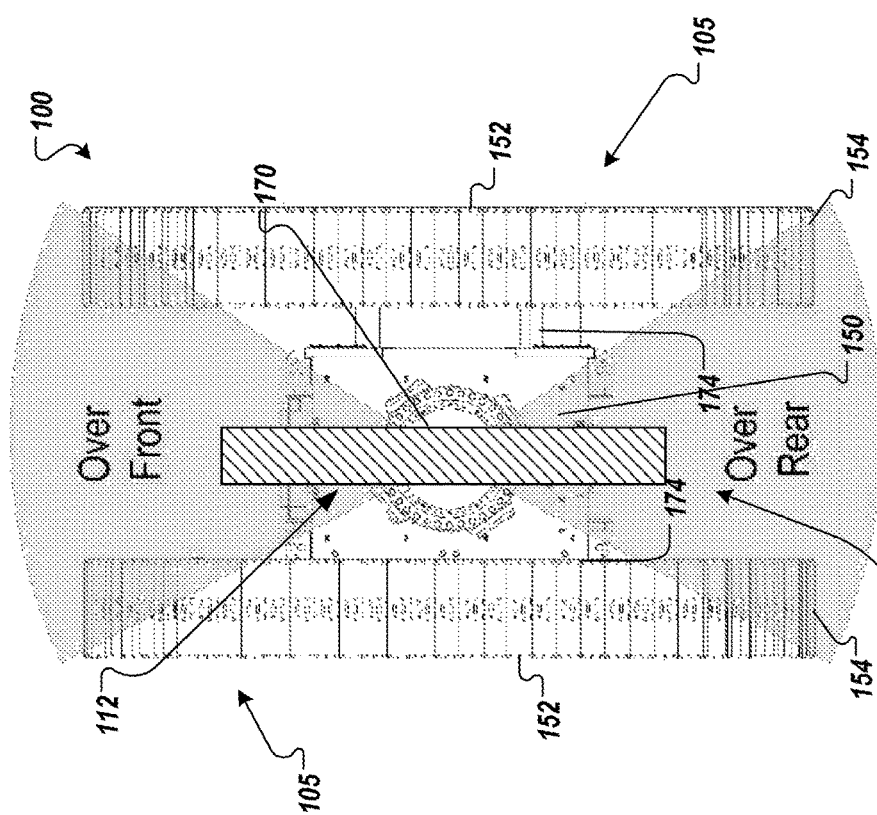

ASYMMETRICAL TRACK CRAWLER POSITIONING SYSTEM

CROSS-REFERENCE TO RELATED APPLICATIONS

This application claims benefit of priority from Provisional U.S. Patent application Ser. No. 62/444,746, filed Jan. 10, 2017 and Provisional U.S. Patent application Ser. No. 62/466,892, filed Mar. 3, 2017, the contents of which are incorporated by reference.

BACKGROUND

Field

The present disclosure generally pertains to track crawler systems, and is more particularly directed to track crawler systems configured to operate with asymmetrically positioned tracks and adjust load limitations depending on sensed track position.

Related Art

Tracked vehicles or machines may be used in a variety of construction, mining, and other industrial applications on varied terrains including asphalt, concrete, dirt, mud, gravel, grass or any other terrain where industrial equipment may be required. In related art tracked machines systems, the stability of the tracked machine may be directly related to the width of tracks such that the wider the tracks the more stable the tracked machine may be. However, larger track width may impede access to narrow areas by some related art tracked machines. To balance these factors, some related art tracked machines may have adjustable width tracks that can be widened to improve stability or narrowed to improve access. Further, some related art systems may allow the tracks to be adjusted asymmetrically such that a track can be extended on one side of the related art tracked machine, and retracted on another, opposite side. However, during lifting operations rotation of the body of the machine relative to the asymmetrically positioned tracks, or the repositioning of the tracks themselves, may cause the stability of the machine to shift. As the stability of the machine shifts, the safe load lifting parameters may change and an operator of the machine may not be aware of how the load lifting parameters have changed. Without being aware of the changes in how load lifting parameters have changed, the operator may inadvertently perform an operation, such as exceeding safe lifting tolerances or rotating into an unstable position, that can cause tipping or failure of the tracked machine.

SUMMARY

Aspects of the present disclosure may include an electronic control system for a tracked machine having a support structure, at least one track roller frame assembly coupled to the support structure and a machine body coupled to the support structure. The electronic control system may include a lateral position sensor that is coupled to the at least one track roller frame assembly and is configured to detect a lateral position of the at least one track roller frame assembly relative to the support structure, an angular position sensor that is coupled to the machine body and is configured to detect an angular position of the machine body relative to the support structure, and a processor configured to determine a parameter for the tracked machine based on the detected lateral position of the at least one track roller frame assembly and the detected angular position of the machine body, wherein the detected lateral position is indicative of asymmetrical positioning of the at least one track roller frame assembly relative to the machine body, and provide feedback based on the parameter for the tracked machine.

Further aspects of the present disclosure may include a tracked machine. The tracked machine may include a support structure, at least one track roller frame assembly coupled to the support structure, a machine body coupled to the support structure, and an electronic control system. The electronic control system may include a lateral position sensor that is coupled to the at least one track roller frame assembly and is configured to detect a lateral position of the at least one track roller frame assembly relative to the support structure, an angular position sensor that is coupled to the machine body and is configured to detect an angular position of the machine body relative to the support structure, and a processor. The processor may be configured to determine a parameter for the tracked machine based on the detected lateral position of the at least one track roller frame assembly and the detected angular position of the machine body, wherein the detected lateral position is indicative of asymmetrical positioning of the at least one track roller frame assembly relative to the machine body, and provide feedback based on the parameter for the tracked machine.

Additional aspects of the present disclosure may include a method of controlling a tracked machine. The tracked machine may have a support structure, at least one track roller frame assembly coupled to the support structure and a machine body coupled to the support structure. The method may include detecting, via a lateral position sensor that is coupled to the at least one track roller frame assembly, a lateral position of the at least one track roller frame assembly relative to the support structure, detecting, via an angular position sensor that is coupled to the machine body, an angular position of the machine body relative to the support structure, determining, via a computing device, a parameter for the tracked machine based on the detected lateral position of the at least one track roller frame assembly and the detected angular position of the machine body, wherein the detected lateral position is indicative of asymmetrical positioning of the at least one track roller frame assembly relative to the machine body, and providing feedback based on the parameter for the tracked machine.

Further aspects of the present disclosure may include a tracked machine. The tracked machine may include a support structure, at least one track roller frame assembly coupled to the support structure, a machine body coupled to the support structure, and an electronic control system. The electronic control system may include means for detecting a lateral position of the at least one track roller frame assembly relative to the support structure, means for detecting an angular position of the machine body relative to the support structure, means for determining a parameter for the tracked machine based on the detected lateral position of the at least one track roller frame assembly and the detected angular position of the machine body, wherein the detected lateral position is indicative of asymmetrical positioning of the at least one track roller frame assembly relative to the machine body, and means for providing feedback based on the parameter for the tracked machine.

BRIEF DESCRIPTION OF THE DRAWINGS

FIGS. 3A and 3B are schematic representations of operational areas associated asymmetric positions of a pair track roller frame assemblies in a first configuration according to example implementations of the present application.

FIGS. 5A and 5B are schematic representations of operational areas associated asymmetric positions of a pair track roller frame assemblies in a third configuration according to example implementations of the present application.

DETAILED DESCRIPTION

Figure 1:
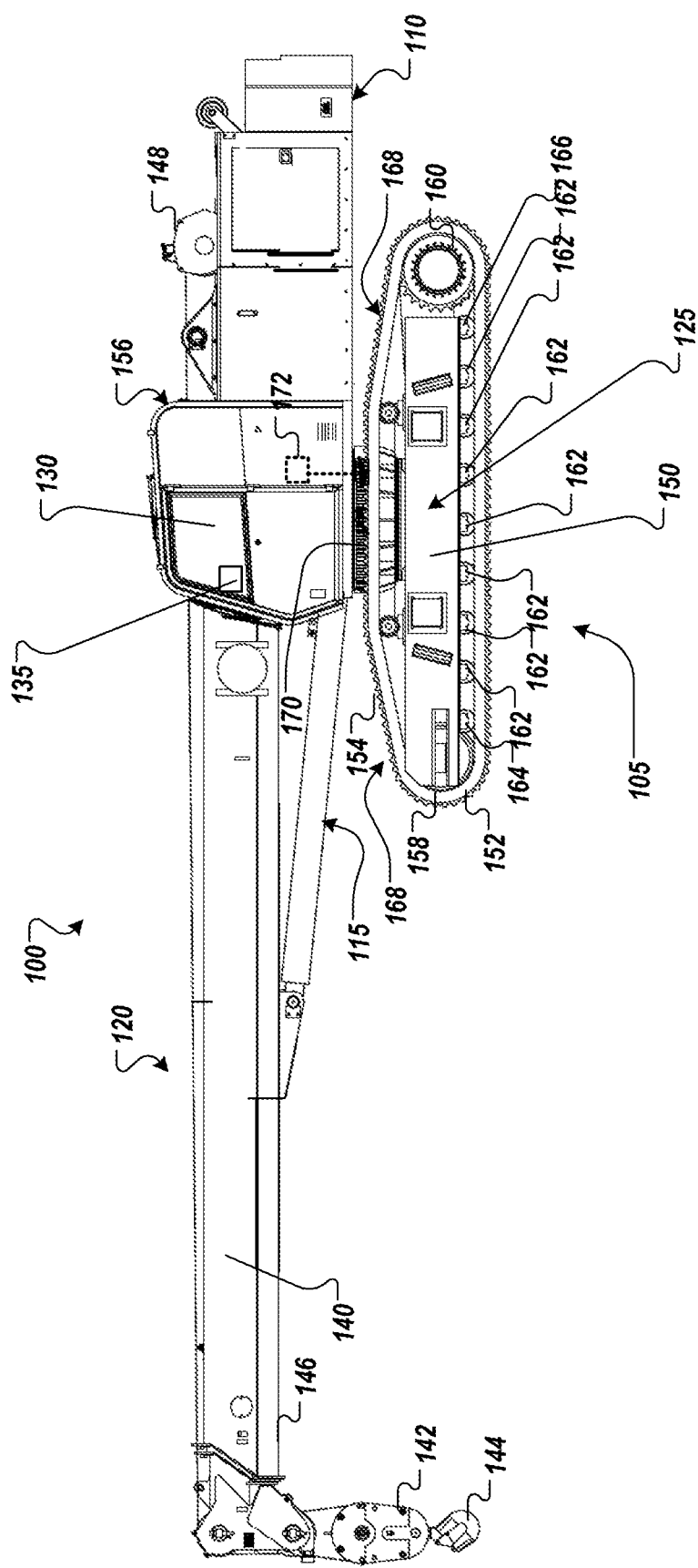
FIG. 1 is a side elevation view of a tracked machine including an undercarriage track system according to example implementations of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

In some example implementations, an electronic control system that senses the placement of the track frame assemblies of a tracked machine, as well as the position of the machine body relative to the track frame assemblies. Based on the sensed placement of the track frame assemblies and the position of the machine body, the electronic control system may determine load performance parameters of the tracked machine and provide feedback to an operator based on the determined load performance parameters. In some example implementations, the operator may then be able to determine which operations of the tracked machine may be safely performed and which operations may not be safely performed based on the provided feedback from the electronic control system.

Figure 2:
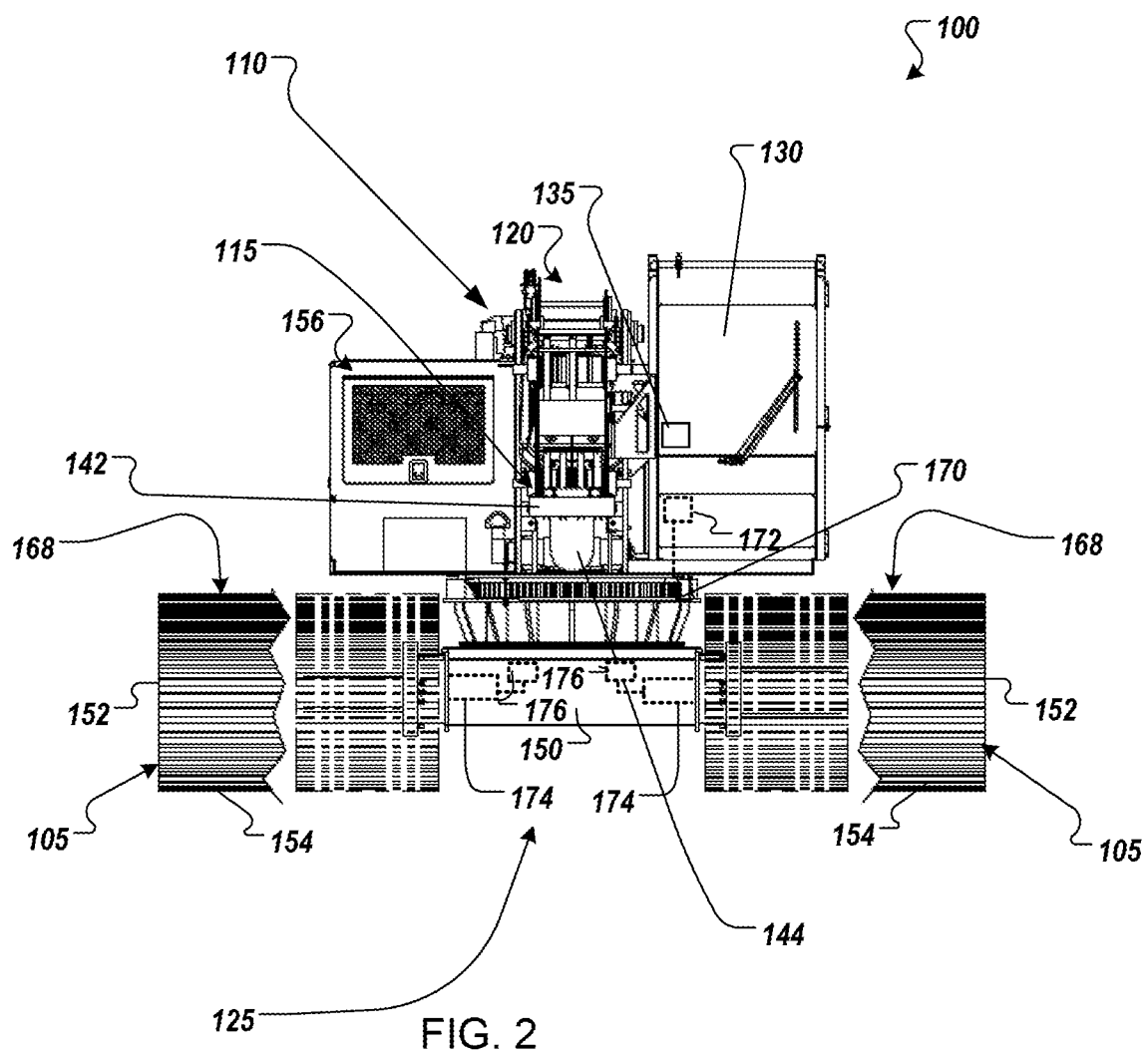
FIG. 2 is a front elevation view of the tracked machine including the undercarriage track system according to example implementations of the present application.

FIG. 1 is a side elevation view of an embodiment of a tracked machine 100 including an undercarriage track system 105. FIG. 2 is a front elevation view of an embodiment of the tracked machine 100 including the undercarriage track system 105 according to example implementations of the present application. The term "machine" may refer to any machine that that performs some type of operation associated with an industry such as mining or construction, or any other industry known in the art, such as a hydraulic mining shovel, lifting crane, an excavator, a track-type tractor (bulldozer), a cable shovel, a dragline, or the like, but is not limited thereto. In the embodiment illustrated, the tracked machine 100 is a track-type boom crane.

The tracked machine 100 may include a machine body 110, one or more hydraulic systems 115, one or more engaging implements 120, and an undercarriage structure 125. The machine body 110 may optionally include a cab 130 to house a machine operator. An electronic control system 135 can be housed in the cab 130 that can be adapted to allow a machine operator to manipulate and articulate the engaging implements 120 for any suitable application and provide performance readouts to the operator. As discussed below, the electronic control system 135 may include a computing device such as computing device 705 of FIG. 7 discussed below.

Though a cab 130 to house an operator is illustrated on the machine body 110, example implementations of the present application are not required to have a cab or be directly operated by an operator on the tracked machine 100. For example, some example implementations of the present application may be remotely operated by an operator not directly riding the tracked machine 100. The remote operator may be in the same general area as the tracked machine 100 or may be located a large distance away. In some embodiments, the electric control system 135 may allow control of the tracked machine 100 via radio frequency communication, cellular communication, wired communication, or any other type of remote control that might be apparent to a person of ordinary skill in the art.

The hydraulic system 115 may connect at one end to the machine body 110 and may support the engaging implement 120 at an opposing, distal end. As illustrated, the engaging implement 120 may be a lifting boom 140 with an attaching system 142 having an attachment implement 144 mounted on a tension line 146. The tension line 146 is around a winch system 148 mounted behind the cab 130. Example implementations are not limited to this configuration, and the winch system 148 may be repositioned as may be apparent to a person of ordinary skill in the art. The engaging implement 120 is not limited to a lifting boom 140 and may be any type of engaging implement 120 that might be apparent to a person of ordinary skill in the art include a bucket boom for lifting an operator, a backhoe implement, or any other implement that might be apparent to a person of ordinary skill in the art.

The undercarriage structure 125 may include a support structure 150 and the undercarriage track system 105. The support structure 150 may connect the undercarriage track system 105 to the machine body 110 and may support the undercarriage track system 105.

The undercarriage track system 105 may include a track roller frame assembly 152 and an associated track chain assembly 154 on each side of the undercarriage structure 125. It will be appreciated that only one track roller frame assembly 152 and only one track chain assembly 154 is visible in FIG. 1.

The tracked machine 100 may also include a power source 156 mounted on the machine body 110 behind the cab 130 (in FIG. 1, adjacent the cab 130 in FIG. 2). The power source 156 may provide power to one or more of the hydraulic system 115, the engaging implement 120, the electronic control system 135, the undercarriage track system 105, or any other system that might be apparent to a person of ordinary skill in the art. The power source 156 may embody an engine such as, for example, a diesel engine, a gasoline engine, a gaseous fuel-powered engine, or any other type of combustion engine known in the art. The power source 156 may alternatively embody a non-combustion source of power such as a fuel cell, a power storage device, or another power source that might be apparent to a person of ordinary skill in in the art. The power source 156 may produce a mechanical or electrical power output that may then be converted to hydraulic pneumatic power for moving the engaging implement 120.

Each track roller frame assembly 152 may include one or more idler wheels 158, a drive sprocket wheel 160, and track roller assemblies 162. In the embodiment illustrated, an idler wheel 158 is coupled to the support structure 150 at one end, and the drive sprocket wheel 160 is coupled to the support structure 150 at an opposite end. In other embodiments, a pair of idler wheels 158 may be coupled to the support structure 150 and the drive sprocket wheel 160 may be adjacent to one of the idler wheels 158.

The drive sprocket wheel 160 may be powered in forward and reverse directions by the power source 156 of the tracked machine 100. In some embodiments, the drive sprocket wheel 160 may be coupled to the engine of the tracked machine 100 by a final drive. The drive sprocket wheel 160 drives the track chain assembly 154 to move the tracked machine 100.

Track roller assemblies 162 may be positioned between the ends of the support structure 150 and at least partially below the support structure 150. In the embodiment illustrated, the track roller assemblies 162 are positioned between the idler wheel 158 and the drive sprocket wheel 160. In other embodiments, the track roller assemblies 162 are positioned between a pair of idler wheels 158. The track roller assemblies 162 may include a front roller assembly 164 may be positioned adjacent the idler wheel 158 at the front end of the support structure 150 and a rear roller assembly 166 may be positioned adjacent the drive sprocket wheel 160 at the rear end of the support structure 150. Idler wheels 158 and track roller assemblies 162/164/166 may be configured to guide the track chain assembly 154 around the support structure 150.

In embodiments, each track chain assembly 154 may include track links (not numbered) inter-connected and linked together to form a closed chain. In the embodiment illustrated, track links are connected to, such as by fastening, ground engaging shoes 168. The ground engaging shoes 168 or ground engaging portions may be configured to overlap. In other embodiments, each track chain assembly 154 includes track pads inter-connected and linked together. The track pads may include a track link and a ground engaging shoe that are cast or forged as an integral unit.

As illustrated, the machine body 110 may be connected to the support structure 150 by a rotating mechanism 170. Further, the support structure 150 may connect two track roller frame assemblies 152 of the undercarriage track system 105 to form a support base for the machine body 110 as illustrated in FIG. 2. In some example implementations, the rotating mechanism 170 may be a hydraulic rotary actuator that allows the machine body 110 to rotate relative to the undercarriage track system 105. However, the rotating mechanism 170 is not limited to this configuration and may be any mechanism that allows relative rotation between the support structure 150 and the machine body 110.

In some example implementations, the rotating mechanism 170 may be connected to an angular position sensor 172 that senses a relative position between the machine body 110 and the support structure 150. The information from the Angular position sensor 172 may be used to set and adjust performance parameters of the engaging implement 120 and provide feedback to the electronic control system 135.

The undercarriage structure 125 may include one or more actuators 174 that connect the support structure 150 to track roller frame assemblies 152 to allow lateral movement of the track roller frame assemblies 152 relative to the support structure 150. In some example implementations, the one or more actuators may be linear hydraulic actuators 174 configured to move each track roller frame assembly 152 laterally relative to the support structure 150 as illustrated in FIGS. 3A-5B discussed below. However, example implementations are not limited to this configuration and any type of actuator 174 that may be apparent to a person of ordinary skill in the art may be used to laterally move the track roller frame assemblies 152. Further in some example implementations, the actuator 174 on each side may be configured to extend independently of the actuator 174 on the other side. For example, an actuator 174 on a left side may be configured to be extended completely, while an actuator 174 is only partial extended or not extended at all.

Further, in some example implementations, each actuator 174 may be connected to a lateral position sensor 176 configured to detect the an amount of extension associated with each actuator 174 to detect lateral positioning of each track roller frame assembly 152 relative to the support structure 150. Based on the information obtained from each lateral position sensor 176 associated with an actuator 174, the electronic control system 135 may provide feedback and adjust performance parameters of the engaging implement 120. For example, different load limits may be imposed based on the lateral extension of the track roller frame assemblies 152 and the actuators 174 connected thereto. Additionally, information from each lateral position sensor 176 associated with an actuator 174 may be combined with information from Angular position sensor 172 associated with the rotating mechanism 170 by the electronic control system 135 to further adjust performance parameters of the engaging implement 120. For example, different load limits may be imposed based on both the lateral extension of the track roller frame assemblies 152 and the rotation position of the machine body 110 relative to the support structure 150. FIGS. 3A-5B discussed below illustrate example implementations of the performance parameter adjustments based on the lateral extension and rotational position information received from the sensors 172/176.

FIGS. 3A and 3B are schematic representations of operational areas associated with different load performance parameter information associated with a track roller frame assembly 152 on one side being fully retracted and a track roller frame assembly 152 being fully extended on an opposite side. The configuration of track roller frame assemblies 152 illustrated in FIGS. 3A and 3B may be referred to a MAX/MIN configuration. In FIGS. 3A and 3B, the support structure 150 is fully illustrated, but the illustration of the machine body 110 has been removed to allow visualization of the top of the support structure 150. A reference bar 112 has been added to illustrate the rotational positioning of the machine body 110 of the support structure 150 in different configurations.

In the configuration illustrated in FIGS. 3A and 3B, one of the actuators 174 (illustrated on the right) has been fully extended, and the other actuator 174 (illustrated on the left) has been fully retracted. Further in FIG. 3A, the reference bar 112 illustrates that the machine body 110 is positioned generally parallel to the track roller frame assemblies 152. The position of the reference bar 112 is not intended to illustrate that the machine body 110 is exactly parallel to the track roller frame assemblies 152, but is intended to illustrate that the machine body 110 is positioned in a general angular range such that the machine body 110 is positioned over the front or rear of the tracked machine 100. The configuration of the placement of the machine body 110 in FIG. 3A may be referred to as an Over Front/Over Rear configuration.

In FIG. 3B, the reference bar 112 illustrates that the machine body 110 is positioned substantially perpendicular to the track roller frame assemblies 152. The position of the reference bar 112 is not intended to illustrate that the machine body 110 is exactly perpendicular to the track roller frame assemblies 152, but is intended to illustrate that the machine body 110 is positioned in a general angular range such that the machine body 110 is positioned over the track roller frame assemblies 152 of the tracked machine 100. The configuration of the placement of the machine body 110 in FIG. 3B may be referred to as an Over Max/Over Min configuration.

As discussed above, lateral position sensors 176 associated with the actuators 174 may detect the lateral positions of the track roller frame assemblies 152. Further, an angular position sensor 172 may detect the angular position of the rotating mechanism 170 to determine the angular position of the machine body 110 (represented by the reference bar 112 in FIGS. 3A & 3B). Based on the measurements of the angular position sensor 172 and the lateral position sensors 176, the electronic control system 135 may set load performance parameters to provide feedback and, in some example implementations optionally limit, operation of the engaging implement 120 of the tracked equipment.

The setting and use of the load performance parameters may be done using an automated process, such as process 600 illustrated in FIG. 6 below that is formed by a computing device, such as computing device 705 in the computing environment 700 of FIG. 7 below. For example, a computing device may automatically select and display on a display device for an operator a load chart relating maximum weight ratings for the lifting boom 140 (illustrated in FIG. 1) to the length of the lifting boom 140 and the radius from the support structure 150. An example load chart is illustrated below as Table 1.

TABLE 1

Main Boom over Max Side
with Asymmetric Track Position: Max and Min
All Loads in lb. × 1000 0-1.5° Slope
45,000 lb. Main Counterweight and 20,000 lb. Car body Counterweight

| RADIUS (ft.) | Main Boom Length (ft.) | | | | | | | | | RADIUS (ft.) |
|---|---|---|---|---|---|---|---|---|---|---|
| | 37.7 | 50.7 | 63.6 | 76.5 | 89.4 | 102.3 | 115.3 | 128.1 | 141.1 | |
| 10 | * | * | * | * | | | | | | 10 |
| 12 | * | * | * | * | | | | | | 12 |
| 15 | * | * | * | * | * | | | | | 15 |
| 20 | 78.2 | * | * | * | * | * | * | | | 20 |
| 25 | 57.5 | 53.8 | 51.1 | * | * | * | * | * | * | 25 |
| 30 | 44.9 | 41.3 | 39.1 | 38.8 | 38.3 | 37.2 | 36.1 | 33.9 | 28.2 | 30 |
| 35 | | 32.8 | 30.7 | 30.6 | 30.3 | 31.3 | 31.7 | 29.9 | 25.7 | 35 |
| 40 | | 26.7 | 24.7 | 24.7 | 24.4 | 25.5 | 26.0 | 26.4 | 23.6 | 40 |
| 45 | | | 20.1 | 20.1 | 19.9 | 21.0 | 21.6 | 22.0 | 21.5 | 45 |
| 50 | | | 16.5 | 16.6 | 16.4 | 17.5 | 18.2 | 18.6 | 19.3 | 50 |
| 55 | | | 13.8 | 13.7 | 13.6 | 14.7 | 15.3 | 15.8 | 16.5 | 55 |
| 60 | | | | 11.3 | 11.2 | 12.3 | 13.0 | 13.5 | 14.2 | 60 |
| 65 | | | | 9.4 | 9.3 | 10.4 | 11.0 | 11.6 | 12.3 | 65 |
| 70 | | | | | 7.6 | 8.7 | 9.4 | 9.9 | 10.6 | 70 |
| 75 | | | | | 6.2 | 7.2 | 7.9 | 8.5 | 9.1 | 75 |
| 80 | | | | | 5.1 | 6.0 | 6.7 | 7.2 | 7.9 | 80 |
| 85 | | | | | | 4.9 | 5.6 | 6.1 | 6.8 | 85 |
| 90 | | | | | | 4.0 | 4.7 | 5.2 | 5.8 | 90 |
| 95 | | | | | | 3.3 | 3.8 | 4.3 | 5.0 | 95 |
| 100 | | | | | | | 3.1 | 3.6 | 4.2 | 100 |
| 105 | | | | | | | 2.4 | 2.9 | 3.5 | 105 |
| 110 | | | | | | | | 2.3 | 2.9 | 110 |
| 115 | | | | | | | | 1.8 | 2.3 | 115 |
| 120 | | | | | | | | 1.4 | 1.8 | 120 |
| 125 | | | | | | | | | 1.3 | 125 |
| 130 | | | | | | | | | 0.9 | 130 |
| 135 | | | | | | | | | | 135 |
| 140 | | | | | | | | | | 140 |
| PARTS OF LINE | 12 | 8 | 8 | 6 | 6 | 4 | 4 | 4 | 2 | PARTS OF LINE |
| SEQ I - TELESCOPING SEQUENCE (%) | | | | | | | | | | |
| 2nd | 0 | 50 | 100 | 100 | 100 | 100 | 100 | 100 | 100 | 2nd |
| 3rd | 0 | 0 | 0 | 50 | 100 | 100 | 100 | 100 | 100 | 3rd |
| 4th | 0 | 0 | 0 | 0 | 0 | 25 | 50 | 75 | 100 | 4th |
| 5th | 0 | 0 | 0 | 0 | 0 | 25 | 50 | 75 | 100 | 5th |

Alternatively, readouts (e.g., warnings) may be displayed of the weight currently being supported by the lifting boom 140 (illustrated in FIG. 1) and whether selected maximum weight limitations are being approached or exceeded or other unsafe operations are initiated. Additionally or alternatively, warning alarms may be sounded or flashing warning indicators may be provided as weight limitations are approached or exceed, or other unsafe operations are initiated. Additionally, in some example implementations, as the machine body 110 (reference bar 112) may be rotated relative to the support structure 150, the load performance parameters may be updated if the machine body 110 moves into another configuration (such as between the configurations illustrated in FIGS. 3A and 3B). The updated load performance parameters may cause the electronic control system 135 to output a warning that tolerances have been exceeded. Further, in some example implementations, the load performance parameters may also be updated if one or both of the actuators 174 is activated to extend or retract the track roller frame assemblies 152 laterally into a new configuration (such as the configurations illustrated in FIGS. 4A-5B discussed below). Again, the updated load performance parameters may cause the electronic control system 135 to output a warning that tolerances have been exceeded.

Additionally, in some example implementations, the electronic control system 135 may automatically perform an operation based on the original or updated performance parameters. For example, the electronic control system 135 may execute an automated rotation of the machine body, or extension of one or both actuators 174, to a safe or stable position based on the original or updated performance parameters. Further, in some example implementations, the electronic control system 135 may prevent the operator from performing an operation that would exceed the original or updated load performance parameters. For example, the electronic control system 135 may not allow the operator to rotate the machine body 110 (represented by reference bar 112) into a different configuration or may not allow one or both of the actuators 174 to be activated to extend or retract the track roller frame assemblies 152 laterally, if the updated load performance parameters associated with the configuration would be exceeded. An operator may be provided with an option to override the automated responses of the electronic control system 135 to maintain control of the tracked machine.

Figures 4A, 4B:
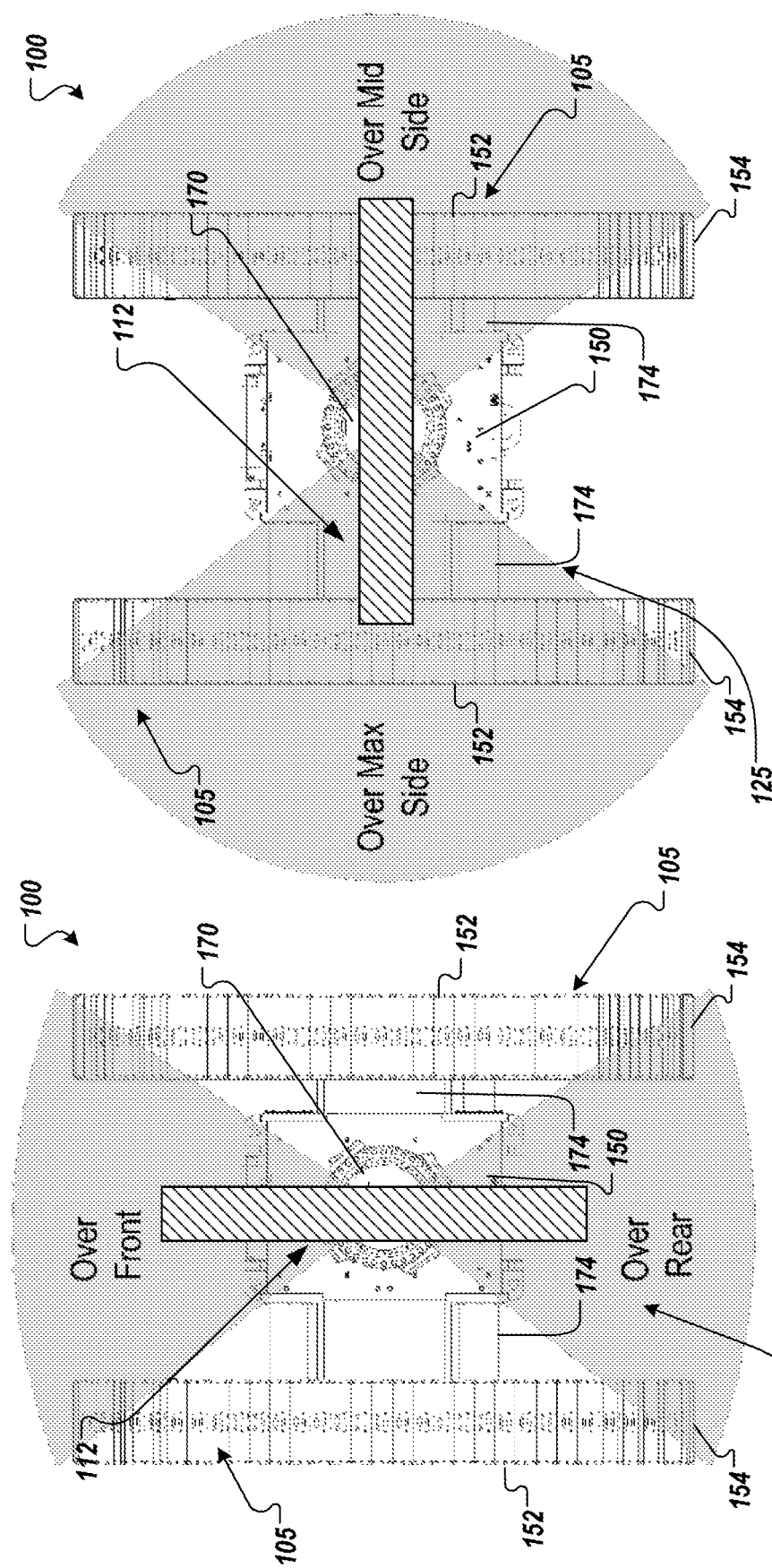
FIGS. 4A and 4B are schematic representations of operational areas associated asymmetric positions of a pair track roller frame assemblies in a second configuration according to example implementations of the present application.

FIGS. 4A and 4B are schematic representations of operational areas associated with different load performance parameter information associated with a track roller frame assembly 152 on one side being partially extended and a track roller frame assembly 152 being fully extended on an opposite side. The configuration of track roller frame assemblies 152 illustrated in FIGS. 4A and 4B may be referred to a MAX/MID configuration. In FIGS. 4A and 4B, the support structure 150 is fully illustrated, but the machine body 110 has been removed to allow visualization of the top of the support structure 150. A reference bar 112 has been added to illustrate the rotational positioning of the machine body 110 of the support structure 150 in different configurations.

In the configuration illustrated in FIGS. 4A and 4B, one of the actuators 174 (illustrated on the left) has been fully extended, and the other actuator 174 (illustrated on the right) has been partially extended. Specifically, the other actuator 174 (right side) has been illustrated extended 50% of total extension. However, other partial extension configurations may be apparent to a person of ordinary skill in the art (e.g., 25% extension, 33% extension, 66% extension, 75% extension, etc.)

Further in FIG. 4A, the reference bar 112 illustrates that the machine body 110 is positioned generally parallel to the track roller frame assemblies 152. The position of the reference bar 112 is not intended to illustrate that the machine body 110 is exactly parallel to the track roller frame assemblies 152, but is intended to illustrate that the machine body 110 is positioned in a general angular range such that the machine body 110 is positioned over the front or rear of the tracked machine 100. The configuration of the placement of the machine body 110 in FIG. 4A may be referred to as an Over Front/Over Rear configuration.

In FIG. 4B, the reference bar 112 illustrates that the machine body 110 is positioned substantially perpendicular to the track roller frame assemblies 152. The position of the reference bar 112 is not intended to illustrate that the machine body 110 is exactly perpendicular to the track roller frame assemblies 152, but is intended to illustrate that the machine body 110 is positioned in a general angular range such that the machine body 110 is positioned over the track roller frame assemblies 152 of the tracked machine 100. The configuration of the placement of the machine body 110 in FIG. 4B may be referred to as an Over Max/Over Mid configuration.

Again, lateral position sensors 176 associated with the actuators 174 may detect the lateral positions of the track roller frame assemblies 152. Further, the angular position sensor 172 may detect the angular position of the rotating mechanism 170 to determine the angular position of the machine body 110 (represented by the reference bar 112 in FIGS. 4A & 4B). Based on the measurements of the angular position sensor 172 and the lateral position sensors 176, the electronic control system 135 may set load performance parameters to provide feedback and, in some example implementations optionally limit, operation of the engaging implement 120 of the tracked equipment.

The setting and use of the load performance parameters may be done using an automated process, such as process 600 illustrated in FIG. 6 below that is formed by a computing device, such as computing device 705 in the computing environment 700 of FIG. 7 below. For example, a computing device may automatically select and display on a display device for an operator a load chart relating maximum weight ratings for the lifting boom 140 (illustrated in FIG. 1) to the length of the lifting boom 140 and the radius from the support structure 150. An example load chart is illustrated below as Table 2.

TABLE 2

Main Boom over Mid Side
with Asymmetric Track Position: Max and Mid
All Loads in lb. × 1000 0-1.5° Slope
45,000 lb. Main Counterweight and 20,000 lb. Car body Counterweight

| RADIUS | Main Boom Length (ft.) | | | | | | | | RADIUS |
|---|---|---|---|---|---|---|---|---|---|
| (ft.) | 37.7 | 50.7 | 63.6 | 76.5 | 89.4 | 102.3 | 115.3 | 128.1 | 141.1 | (ft.) |
| 10 | 176.4 | 111.6 | 98.6 | 96.1 | | | | | | 10 |
| 12 | 135.7 | 111.6 | 97.2 | 91.3 | | | | | | 12 |
| 15 | 97.9 | 92.5 | 88.0 | 76.9 | 70.3 | | | | | 15 |
| 20 | 65.4 | 61.8 | 59.0 | 58.0 | 56.8 | 37.2 | 37.2 | | | 20 |
| 25 | 48.3 | 45.4 | 43.3 | 42.8 | 42.1 | 37.2 | 36.3 | 34.8 | 28.8 | 25 |
| 30 | 37.9 | 35.1 | 33.3 | 33.1 | 32.6 | 33.2 | 33.4 | 32.7 | 28.2 | 30 |
| 35 | | 28.0 | 26.4 | 26.3 | 26.0 | 26.7 | 27.1 | 27.1 | 25.7 | 35 |

TABLE 2-continued

Main Boom over Mid Side
with Asymmetric Track Position: Max and Mid
All Loads in lb. × 1000 0-1.5° Slope
45,000 lb. Main Counterweight and 20,000 lb. Car body Counterweight

| RADIUS (ft.) | Main Boom Length (ft.) | | | | | | | | | RADIUS (ft.) |
|---|---|---|---|---|---|---|---|---|---|---|
| | 37.7 | 50.7 | 63.6 | 76.5 | 89.4 | 102.3 | 115.3 | 128.1 | 141.1 | |
| 40 | | 23.0 | 21.4 | 21.4 | 21.2 | 22.0 | 22.4 | 22.6 | 22.7 | 40 |
| 45 | | | 17.6 | 17.6 | 17.5 | 18.3 | 18.7 | 19.0 | 19.4 | 45 |
| 50 | | | 14.7 | 14.7 | 14.6 | 15.4 | 15.9 | 16.2 | 16.7 | 50 |
| 55 | | | 12.4 | 12.3 | 12.2 | 13.1 | 13.6 | 13.9 | 14.4 | 55 |
| 60 | | | | 10.4 | 10.3 | 11.1 | 11.6 | 12.0 | 12.5 | 60 |
| 65 | | | | 8.8 | 8.7 | 9.5 | 10.0 | 10.4 | 10.9 | 65 |
| 70 | | | | | 7.3 | 8.1 | 8.6 | 9.0 | 9.5 | 70 |
| 75 | | | | | 6.2 | 6.9 | 7.5 | 7.8 | 8.4 | 75 |
| 80 | | | | | 5.1 | 5.9 | 6.4 | 6.8 | 7.3 | 80 |
| 85 | | | | | | 4.9 | 5.5 | 5.9 | 6.4 | 85 |
| 90 | | | | | | 4.0 | 4.7 | 5.1 | 5.6 | 90 |
| 95 | | | | | | 3.3 | 3.8 | 4.3 | 4.9 | 95 |
| 100 | | | | | | | 3.1 | 3.6 | 4.2 | 100 |
| 105 | | | | | | | 2.4 | 2.9 | 3.5 | 105 |
| 110 | | | | | | | | 2.3 | 2.9 | 110 |
| 115 | | | | | | | | 1.8 | 2.3 | 115 |
| 120 | | | | | | | | 1.4 | 1.8 | 120 |
| 125 | | | | | | | | | 1.3 | 125 |
| 130 | | | | | | | | | 0.9 | 130 |
| 135 | | | | | | | | | | 135 |
| 140 | | | | | | | | | | 140 |
| PARTS OF LINE | 12 | 8 | 8 | 6 | 6 | 4 | 4 | 4 | 2 | PARTS OF LINE |
| SEQ I - TELESCOPING SEQUENCE (%) | | | | | | | | | | |
| 2nd | 0 | 50 | 100 | 100 | 100 | 100 | 100 | 100 | 100 | 2nd |
| 3rd | 0 | 0 | 0 | 50 | 100 | 100 | 100 | 100 | 100 | 3rd |
| 4th | 0 | 0 | 0 | 0 | 0 | 25 | 50 | 75 | 100 | 4th |
| 5th | 0 | 0 | 0 | 0 | 0 | 25 | 50 | 75 | 100 | 5th |

Alternatively, readouts (e.g., warnings) may be displayed of the weight currently being supported by the lifting boom 140 (illustrated in FIG. 1) and whether selected maximum weight limitations are being approached or exceeded or other unsafe operations are initiated. Additionally or alternatively, warning alarms may be sounded or flashing warning indicators may be provided as weight limitations are approached or exceed, or other unsafe operations are initiated. Additionally, in some example implementations, as the machine body 110 (reference bar 112) may be rotated relative to the support structure 150, the load performance parameters may updated if the machine body 110 moves into another configuration (such as between the configurations illustrated in FIGS. 4A and 4B). The updated load performance parameters may cause the electronic control system 135 to output a warning that tolerances have been exceeded. Further, in some example implementations, the load performance parameters may also be updated if one or both of the actuators 174 is activated to extend or retract the track roller frame assemblies 152 laterally into a new configuration (such as the configurations illustrated in FIGS. 3A-3B discussed above and FIGS. 5A-5B discussed below). Again, the updated load performance parameters may cause the electronic control system 135 to output a warning that tolerances have been exceeded.

Additionally, in some example implementations, the electronic control system 135 may automatically perform an operation based on the original or updated performance parameters. For example, the electronic control system 135 may execute an automated rotation of the machine body, or extension of one or both actuators 174, to a safe or stable position based on the original or updated performance parameters. Further, in some example implementations, the electronic control system 135 may prevent the operator from performing an operation that would exceed the original or updated load performance parameters. For example, the electronic control system 135 may not allow the operator to rotate the machine body 110 (represented by reference bar 112) into a different configuration or may not allow one or both of the actuators 174 to be activated to extend or retract the track roller frame assemblies 152 laterally, if the updated load performance parameters associated with the configuration would be exceeded. Of course an operator may be provided with an option to override the automated responses of the electronic control system 135 to maintain control the tracked machine.

FIGS. 5A and 5B are schematic representations of operational areas associated with different load performance parameter information associated with a track roller frame assembly 152 on one side being partially extended and a track roller frame assembly 152 being fully retracted on an opposite side. The configuration of track roller frame assemblies 152 illustrated in FIGS. 5A and 5B may be referred to as a MIN/MID configuration. In FIGS. 5A and 5B, the support structure 150 is fully illustrated, but the machine body 110 has been removed to allow visualization of the top of the support structure 150. A reference bar 112 has been added to illustrate the rotational positioning of the machine body 110 of the support structure 150 in different configurations.

In the configuration illustrated in FIGS. 5A and 5B, one of the actuators 174 (illustrated on the left) has been fully retracted, and the other actuator 174 (illustrated on the right) has been partially extended. Specifically, the other actuator 174 (right side) has been illustrated extended 50% of total extension. However, other partial extension configurations may be apparent to a person of ordinary skill in the art (e.g., 25% extension, 33% extension, 66% extension, 75% extension, etc.)

Further, in FIG. 5A, the reference bar 112 illustrates that the machine body 110 is positioned generally parallel to the track roller frame assemblies 152. The position of the reference bar 112 is not intended to illustrate that the machine body 110 is exactly parallel to the track roller frame assemblies 152, but is intended to illustrate that the machine body 110 is positioned in a general angular range such that the machine body 110 is positioned over the front or rear of the tracked machine 100. The configuration of the placement of the machine body 110 in FIG. 5A may be referred to as an Over Front/Over Rear configuration.

In FIG. 5B, the reference bar 112 illustrates that the machine body 110 is positioned substantially perpendicular to the track roller frame assemblies 152. The position of the reference bar 112 is not intended to illustrate that the machine body 110 is exactly perpendicular to the track roller frame assemblies 152, but is intended to illustrate that the machine body 110 is positioned in a general angular range such that the machine body 110 is positioned over the track roller frame assemblies 152 of the tracked machine 100. The configuration of the placement of the machine body 110 in FIG. 4B may be referred to as an Over Min/Over Mid configuration.

Again, lateral position sensors 176 associated with the actuators 174 may detect the lateral positions of the track roller frame assemblies 152. Further, the angular position sensor 172 may detect the angular position of the rotating mechanism 170 to determine the angular position of the machine body 110 (represented by the reference bar 112 in FIGS. 5A & 5B). Based on the measurements of the angular position sensor 172 and the lateral position sensors 176, the electronic control system 135 may set load performance parameters to provide feedback and, in some example implementations optionally limit, operation of the engaging implement 120 of the tracked equipment.

The setting and use of the load performance parameters may be done using an automated process, such as process 600 illustrated in FIG. 6 below that is formed by a computing device, such as computing device 705 in the computing environment 700 of FIG. 7 below. For example, a computing device may automatically select and display on a display device for an operator a load chart relating maximum weight ratings for the lifting boom 140 (illustrated in FIG. 1) to the length of the lifting boom 140 and the radius from the support structure 150. An example load chart is illustrated below as Table 3.

TABLE 3

Main Boom over Min Side
with Asymmetric Track Position: Min and Mid
All Loads in lb. × 1000 0-1.5° Slope
45,000 lb. Main Counterweight and 20,000 lb. Car body Counterweight

| RADIUS | Main Boom Length (ft.) | | | | | | | | | RADIUS |
|---|---|---|---|---|---|---|---|---|---|---|
| (ft.) | 37.7 | 50.7 | 63.6 | 76.5 | 89.4 | 102.3 | 115.3 | 128.1 | 141.1 | (ft.) |
| 10 | 176.4 | 111.6 | 98.6 | 96.1 | | | | | | 10 |
| 12 | 160.6 | 111.6 | 97.2 | 91.3 | | | | | | 12 |
| 15 | 140.3 | 111.6 | 95.3 | 76.9 | 70.3 | | | | | 15 |
| 20 | 114.7 | 110.2 | 78.7 | 66.2 | 58.1 | 37.2 | 37.2 | | | 20 |
| 25 | 90.5 | 85.8 | 66.8 | 56.1 | 49.2 | 37.2 | 36.3 | 34.8 | 28.8 | 25 |
| 30 | 65.5 | 64.7 | 57.8 | 48.4 | 42.4 | 37.2 | 36.1 | 33.9 | 28.2 | 30 |
| 35 | | 51.2 | 48.9 | 42.3 | 37.0 | 33.9 | 31.7 | 29.9 | 25.7 | 35 |
| 40 | | 42.0 | 39.9 | 37.4 | 32.7 | 30.0 | 28.2 | 26.6 | 23.6 | 40 |
| 45 | | | 33.3 | 33.1 | 29.0 | 26.7 | 25.2 | 23.9 | 21.5 | 45 |
| 50 | | | 28.3 | 28.1 | 26.0 | 24.0 | 22.6 | 21.5 | 19.4 | 50 |
| 55 | | | 24.4 | 24.1 | 23.4 | 21.6 | 20.5 | 19.5 | 17.7 | 55 |
| 60 | | | | 20.9 | 20.7 | 19.6 | 18.6 | 17.7 | 16.1 | 60 |
| 65 | | | | 18.4 | 18.1 | 17.9 | 17.0 | 16.2 | 14.8 | 65 |
| 70 | | | | | 15.9 | 16.4 | 15.5 | 14.8 | 13.5 | 70 |
| 75 | | | | | 14.1 | 14.8 | 14.3 | 13.6 | 12.5 | 75 |
| 80 | | | | | 12.6 | 13.2 | 13.1 | 12.5 | 11.5 | 80 |
| 85 | | | | | | 11.8 | 12.1 | 11.6 | 10.6 | 85 |
| 90 | | | | | | 10.6 | 11.1 | 10.7 | 9.8 | 90 |
| 95 | | | | | | 9.7 | 10.0 | 9.9 | 9.1 | 95 |
| 100 | | | | | | | 9.1 | 9.2 | 8.4 | 100 |
| 105 | | | | | | | 8.3 | 8.5 | 7.8 | 105 |
| 110 | | | | | | | | 7.8 | 7.3 | 110 |
| 115 | | | | | | | | 7.1 | 6.7 | 115 |
| 120 | | | | | | | | 6.6 | 6.3 | 120 |
| 125 | | | | | | | | | 5.8 | 125 |
| 130 | | | | | | | | | 5.4 | 130 |
| 135 | | | | | | | | | | 135 |
| 140 | | | | | | | | | | 140 |
| PARTS OF LINE | 12 | 8 | 8 | 6 | 6 | 4 | 4 | 4 | 2 | PARTS OF LINE |
| SEQ I - TELESCOPING SEQUENCE (%) | | | | | | | | | | |
| 2nd | 0 | 50 | 100 | 100 | 100 | 100 | 100 | 100 | 100 | 2nd |
| 3rd | 0 | 0 | 0 | 50 | 100 | 100 | 100 | 100 | 100 | 3rd |
| 4th | 0 | 0 | 0 | 0 | 0 | 25 | 50 | 75 | 100 | 4th |
| 5th | 0 | 0 | 0 | 0 | 0 | 25 | 50 | 75 | 100 | 5th |

Alternatively, readouts (e.g., warnings) may be displayed of the weight currently being supported by the lifting boom 140 (illustrated in FIG. 1) and whether selected maximum weight limitations are being approached or exceeded or other unsafe operations are initiated. Additionally or alternatively, warning alarms may be sounded or flashing warning indicators may be provided as weight limitations are approached or exceed, or other unsafe operations are initiated. Additionally, in some example implementations, as the machine body 110 (reference bar 112) may be rotated relative to the support structure 150, the load performance parameters may updated if the machine body 110 moves into another configuration (such as between the configurations illustrated in FIGS. 5A and 5B). The updated load performance parameters may cause the electronic control system 135 to output a warning that tolerances have been exceeded. Further, in some example implementations, the load performance parameters may also be updated if one or both of the actuators 174 is activated to extend or retract the track roller frame assemblies 152 laterally into a new configuration (such as the configurations illustrated in FIGS. 3A-4B discussed above). Again, the updated load performance parameters may cause the electronic control system 135 to output a warning that tolerances have been exceeded.

Additionally, in some example implementations, the electronic control system 135 may automatically perform an operation based on the original or updated performance parameters. For example, the electronic control system 135 may execute an automated rotation of the machine body, or extension of one or both actuators 174, to a safe or stable position based on the original or updated performance parameters. Further, in some example implementations, the electronic control system 135 may prevent the operator from performing an operation that would exceed the original or updated load performance parameters. For example, the electronic control system 135 may not allow the operator to rotate the machine body 110 (represented by reference bar 112) into a different configuration or may not allow one or both of the actuators 174 to be activated to extend or retract the track roller frame assemblies 152 laterally, if the updated load performance parameters associated with the configuration would be exceeded. Of course an operator may be provided with an option to override the automated responses of the electronic control system 135 to maintain control the tracked machine.

Figure 6:
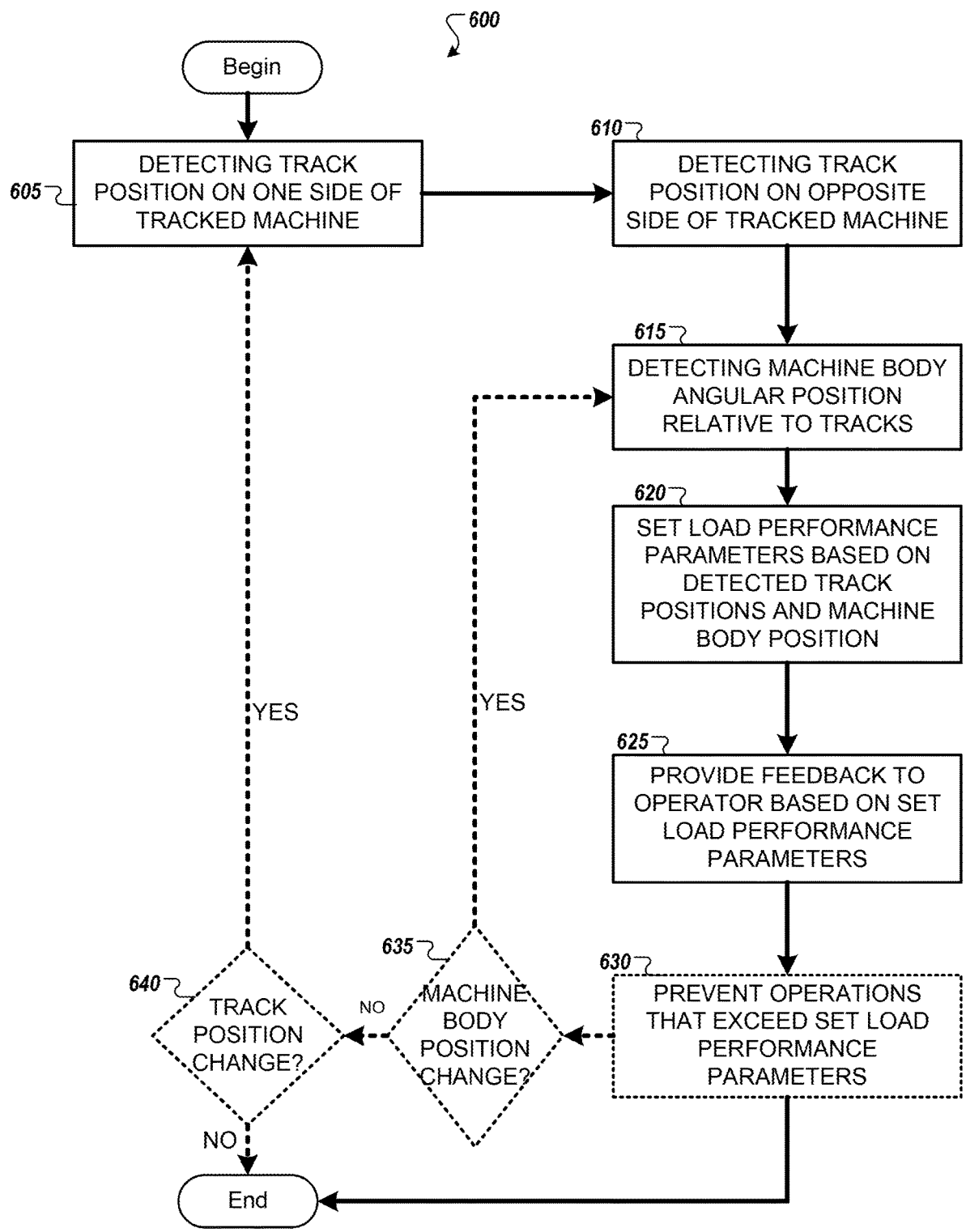
FIG. 6 illustrates a flow chart for a process of controlling a tracked machine according to example implementations of the present application.

FIG. 6 illustrates a flow chart for a process 600 of controlling a tracked machine. The process 600 may be performed by an electronic control system of a tracked machine having a pair of track assemblies, such as the electronic control system 135 of the tracked machine 100 illustrated in FIGS. 1-5B discussed above. In some example implementations, the electronic control system 135 may include a computing device such as computing device 705 of FIG. 7 discussed below.

At 605, the electronic control system may detect the position of one of the track assemblies on a first side of the tracked machine. In some example implementations, the position of the track assembly may be detected using a sensor connected to an actuator configured to move the track assembly laterally relative to the tracked machine. However, other configurations may be used to detect the position of the track assembly on the first side of the tracked machine as might be apparent to a person of ordinary skill in the art.

In some example implementations, the position of the track assembly may be detected as being in one of three fixed positions (e.g., "Fully Retracted", "Fully Extended", And "Half Extended-Half Retracted"). In other example implementations, the position of the track assembly may be detected as being positioned along a continuous spectrum of positions between fully extended and fully retracted.

At 610, the electronic control system may detect the position of the other track assembly on a second side opposite the first side of the tracked machine. Again, in some example implementations, the position of the track assembly may be detected using a sensor connected to an actuator configured to move the track assembly laterally relative to the tracked machine. However, other configurations may be used to detect the position of the track assembly on the second side of the tracked machine as might be apparent to a person of ordinary skill in the art.

In some example implementations, the position of the track assembly may be detected as being in one of three fixed positioned (e.g., "Fully Retracted", "Fully Extended", And "Half Extended-Half Retracted"). In other example implementations, the position of the track assembly may be detected as being positioned along a continuous spectrum of positions between fully extended and fully retracted.

At 615, the relative angular position between the machine body of the tracked machine and a support structure supporting the track assemblies is detected. In some example implementations, the relative angular position may be detected by an angular sensor connected to a rotating mechanism that joins the machine body to the support structure. However, other configurations may be used to detect the position of the machine body relative to the track assembly as might be apparent to a person of ordinary skill in the art.

In some example implementations, the relative position of the machine body may be detected as being in any position around a 360° spectrum. In other example implementations, the relative position of the machine body may be detected as being in one of a plurality of fixed positions (e.g., "Over Front", "Over Rear", "Over Right Track", "Over Left Track").

After the positions of the track assemblies and the relative rotational position of the machine body have been detected at steps 605-615, load performance parameters are set based on the detected track positions and the machine body position at 620. In some example implementations, the setting of load performance parameters may include automatically selecting a pre-defined load performance table from a plurality of stored load performance tables based on the detected track positions and machine body position. In other example implementations, the setting of load performance parameters may include calculating load performance parameters using known load tolerance equations based on the dimensions of the tracked machine, the lifting rating of a lifting boom, and other factors that control how much weight a lifting boom can safely lift that might be apparent to a person of ordinary skill in the art. In some example implementations, the calculation of load performance parameters may be performed using static data that is capture only one time, recurrent data calculated at regular time intervals, or dynamic data streams of being continuously received from one or more sensors.

After load performance parameters are set, an electronic control system provides feedback to an operator of the tracked machine. In some example implementations, the feedback may include displaying the selected load chart relating maximum weight ratings for the lifting boom 140 (illustrated in FIG. 1) to the length of the lifting boom 140 and the radius from the support structure 150. Example load charts are illustrated as Tables 1-3 above.

In other example implementations, the feedback may include generating warning readouts to be displayed of the weight currently being supported by the lifting boom 140 (illustrated in FIG. 1) and whether selected maximum weight limitations are being approached or exceeded. After the feedback has been provided to the operator at 625, the process 600 may end in some example implementations.

Optionally, in other example implementations, the electronic control system may also prevent the remote or in cab operator from performing an operation that would exceed the set load performance parameters at 630. For example, the electronic control system 135 may not allow the operator to rotate the machine body 110 (represented by reference bar 112) into a different configuration or may not allow one or both of the actuators 174 to be activated to extend or retract the track roller frame assemblies 152 laterally, if load performance parameters associated with a new configuration would be exceeded.

In some example implementations, at 635 the electronic control system may optionally determine if the rotational position of the machine body has changed since the load performance parameters were set. In some example implementations, a change in the relative angular position of the machine body may be detected by an angular sensor connected to a rotating mechanism that joins the machine body to the support structure. However, other configurations may be used to determine if the rotational position of the machine body relative to the track assembly has changed as might be apparent to a person of ordinary skill in the art.

If the electronic control system determines that the machine body's rotational position has changed (YES at 635), the process 600 may return to 615 and the steps 615-625 may be repeated to determine updated load performance patterns and provide updated feedback to an operator. For example, the updated load performance parameters may cause the electronic control system to output a warning that tolerances have been exceeded. Additionally, in some example implementations, the electronic control system may also optionally prevent the operator from performing an operation that would exceed the updated load performance parameters at 630. For example, the electronic control system 135 may not allow the operator to rotate the machine body 110 (represented by reference bar 112) into a different configuration or may not allow one or both of the actuators 174 to be activated to extend or retract the track roller frame assemblies 152 laterally, if load performance parameters associated with a new configuration would be exceeded.

However, if the electronic control system determines that the machine body's rotational position has not changed (NO at 635), the process 600 may continue to 640. In some example implementations, at 640 the electronic control system may optionally determine if the lateral positions of either of the track assemblies has changed since the load performance parameters were set. In some example implementations, a change in the lateral position of either of the track assemblies may be detected by a sensor connected to the actuator connecting the track assembly to the support structure. However, other configurations may be used to determine if the lateral position of either track assembly has changed as might be apparent to a person of ordinary skill in the art.

If the electronic control system determines that the lateral position of either track assembly has changed (YES at 640), the process 600 may return to 605 and the steps 605-625 may optionally be repeated to determine updated load performance patterns and provide updated feedback to an operator. For example, the updated load performance parameters may cause the electronic control system to output a warning that tolerances have been exceeded. Additionally, in some example implementations, the electronic control system may also optionally prevent the operator from performing an operation that would exceed the updated load performance parameters at 630. For example, the electronic control system 135 may not allow the operator to rotate the machine body 110 (represented by reference bar 112) into a different configuration or may not allow one or both of the actuators 174 to be activated to extend or retract the track roller frame assemblies 152 laterally, if load performance parameters associated with a new configuration would be exceeded.

However, if the electronic control system determines that the machine body's rotational position has not changed (NO at 640), the process 600 may end.

Figure 7:
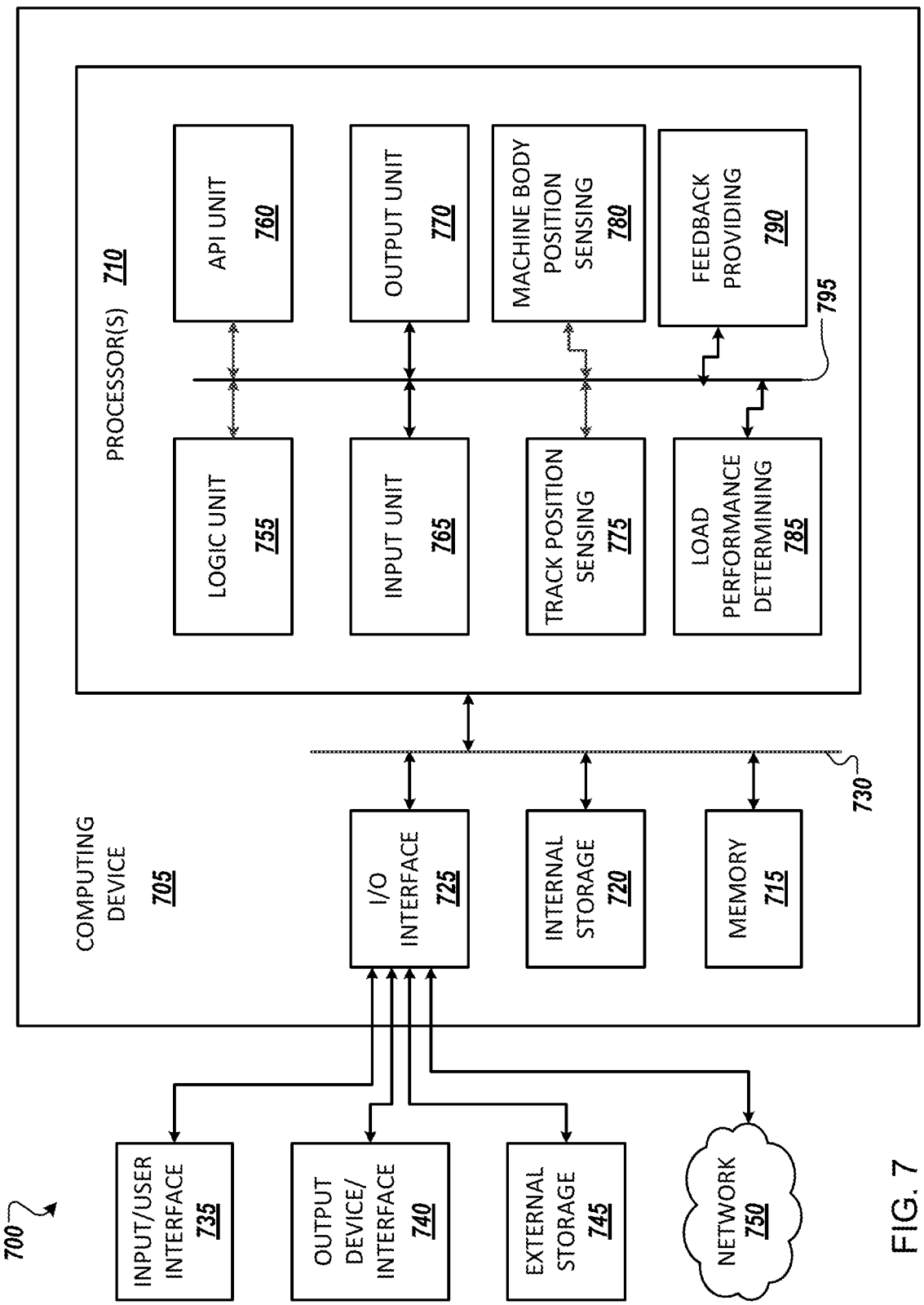
FIG. 7 illustrates an example computing environment 700 for an electronic control system for a tracked machine according to example implementations of the present application.

FIG. 7 illustrates an example computing environment 700 for an electronic control system for a tracked machine, such as the electronic control system 135 of the tracked machine 100 of FIG. 1. In some example implementations, the electronic control system may be a local control system allowing control by an operator located on the tracked machine. In other example implementations, the electric control system may be a remote control system allowing control by a remote operator not directly located on the tracked machine. In some example implementations, the remote operator may be in the same general area as the tracked machine. In other example implementations, the remote operator may be located a large distance away from the tracked machine. The electronic control system may allow control of the tracked machine via radio frequency communication, cellular communication, wired communication, or any other type of remote control that might be apparent to a person of ordinary skill in the art.

The computing device 705 in the computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computing device 705. In other example implementations, other computing devices may function as or provide the functions of input/user interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 710 can execute under any operating system (OS) (not shown), in a native or virtual environment. One or more applications can be deployed that include logic unit 755, application programming interface (API) unit 760, input unit 765, output unit 770, track position sensing unit 775, machine body position sensing unit 780, load performance determining unit 785, feedback providing unit 790, and inter-unit communication mechanism 795 for the different units to communicate with each other, with the OS, and with other applications (not shown). For example, track position sensing unit 775, machine body position sensing unit 780, load performance determining unit 785, feedback providing unit 790, may implement one or more processes shown in FIG. 6. The described units and elements can be varied in design, function, configuration, or implementation and are not limited to the descriptions provided.

In some example implementations, when information or an execution instruction is received by API unit 760, it may be communicated to one or more other units (e.g., logic unit 755, input unit 765, output unit 770, track position sensing unit 775, machine body position sensing unit 780, load performance determining unit 785, feedback providing unit 790). For example, the track position sensing unit 775 may receive information from track position sensors via input unit 765. Similarly, the machine body position sensing unit 780 may also receive information from angular position sensors via input unit 765. Further, both the track position sensing unit 775 and the machine body position sensing unit 780 may provide information to the load performance determining unit 785 to determine the load performance parameters. Based on the determined the load performance parameters, the feedback providing unit 790 may provide feedback to an operator of the tracked machine via the output unit 770.

In some instances, the logic unit 755 may be configured to control the information flow among the units and direct the services provided by API unit 760, input unit 765, output unit 770, track position sensing unit 775, machine body position sensing unit 780, load performance determining unit 785, and feedback providing unit 790 in some example implementations described above. For example, the flow of one or more processes or implementations may be controlled by logic unit 755 alone or in conjunction with API unit 760.

The foregoing detailed description has set forth various example implementations of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware.

While certain example implementations have been described, these example implementations have been presented by way of example only, and are not intended to limit the scope of the protection. Indeed, the novel apparatuses described herein may be embodied in a variety of other forms. Furthermore, various omissions, substitutions and changes in the form of the systems described herein may be made without departing from the spirit of the protection. The accompanying claims and their equivalents are intended to cover such forms or modifications as would fall within the scope and spirit of the protection.

We claim:

1. An electronic control system for a tracked machine having a support structure, at least one track roller frame assembly coupled to the support structure and a machine body coupled to the support structure, the electronic control system comprising:

a lateral position sensor that is coupled to the at least one track roller frame assembly and is configured to detect a lateral position of the at least one track roller frame assembly relative to the support structure;

an angular position sensor that is coupled to the machine body and is configured to detect an angular position of the machine body relative to the support structure;

a memory storing a plurality of load tables associated with operations of the tracked machine;

a display device coupled to the memory; and a processor coupled to the memory and the display, the processor configured to:

determine a parameter for the tracked machine based on the detected lateral position of the at least one track roller frame assembly and the detected angular position of the machine body, wherein the detected lateral position is indicative of asymmetrical positioning of the at least one track roller frame assembly relative to the machine body, wherein the determining the parameter comprises selecting a load table from the plurality of load tables stored in the memory based on the detected lateral position of the at least one track roller frame assembly and the detected angular position of the machine body; and provide feedback based on the parameter for the tracked machine, wherein the provided feedback comprises displaying the selected load table on the display device.

2. The electronic control system of claim 1, wherein the processor is configured to provide further feedback based on the parameter by one or more of:
sounding an alarm based on the parameter and a current operation being performed by the tracked machine; and
displaying an indicator based on the parameter and a current operation being performed by the tracked machine.

3. The electronic control system of claim 1, wherein the processor is further configured to:
detect, by the angular position sensor, a change in the angular position of the machine body relative to the support structure;
determine an updated parameter for the tracked machine based on the change in angular position of the machine body relative to the support structure and the detected lateral position of the at least one track roller frame assembly; and
provide feedback based on the updated parameter for the tracked machine.

4. The electronic control system of claim 1, wherein the processor is further configured to:
detect, by the lateral position sensor, a change in the lateral position of the at least one track roller frame assembly relative to the support structure;
determine an updated parameter for the tracked machine based on the change in lateral position of the at least one track roller frame assembly relative to the support structure and the angular position of the machine body relative to the support structure; and
provide feedback based on the updated parameter for the tracked machine.

5. The electronic control system of claim 1, wherein the processor is further configured to control one or more of the angular position of the machine body, the lateral position of the at least one track roller frame assembly and an engaging implement of the tracked machine to perform an operation based on the parameter for the tracked machine.

6. The electronic control system of claim 1, wherein the processor is further configured to control one or more of the angular position of the machine body, the lateral position of the at least one track roller frame assembly and an engaging implement of the tracked machine to block an operator-requested operation based on the parameter for the tracked machine.

7. A tracked machine comprising:
a support structure;
at least one track roller frame assembly coupled to the support structure;
a machine body coupled to the support structure; and
an electronic control system comprising
a lateral position sensor that is coupled to the at least one track roller frame assembly and is configured to detect a lateral position of the at least one track roller frame assembly relative to the support structure;
an angular position sensor that is coupled to the machine body and is configured to detect an angular position of the machine body relative to the support structure; and
a memory storing a plurality of load tables associated with operations of the tracked machine;
a display device coupled to the memory;
a processor coupled to the memory and the display, the processor configured to:
determine a parameter for the tracked machine based on the detected lateral position of the at least one track roller frame assembly and the detected angular position of the machine body, wherein the detected lateral position is indicative of asymmetrical positioning of the at least one track roller frame assembly relative to the machine body,
wherein the determining the parameter comprises selecting a load table from the plurality of load tables stored in the memory based on the detected lateral position of the at least one track roller frame assembly and the detected angular position of the machine body; and
provide feedback based on the parameter for the tracked machine,
wherein the provided feedback comprises displaying the selected load table on the display device.

8. The tracked machine of claim 7, wherein the processor is configured to provide further feedback based on the parameter by one or more of:
sounding an alarm based on the parameter and a current operation being performed by the tracked machine; and
displaying an indicator based on the parameter and a current operation being performed by the tracked machine.

9. The tracked machine of claim 7, wherein the processor is further configured to:
detect, by the angular position sensor, a change in the angular position of the machine body relative to the support structure;
determine an updated parameter for the tracked machine based on the change in angular position of the machine body relative to the support structure and the detected lateral position of the at least one track roller frame assembly; and
provide feedback based on the updated parameter for the tracked machine.

10. The tracked machine of claim 7, wherein the processor is further configured to:
detect, by the lateral position sensor, a change in the lateral position of the at least one track roller frame assembly relative to the support structure;
determine an updated parameter for the tracked machine based on the change in lateral position of the at least one track roller frame assembly relative to the support structure and the angular position of the machine body relative to the support structure; and
provide feedback based on the updated parameter for the tracked machine.

11. The tracked machine of claim 7, wherein the processor is further configured to control one or more of the angular position of the machine body, the lateral position of the at least one track roller frame assembly and an engaging implement of the tracked machine to perform an operation based on the parameter for the tracked machine.

12. The tracked machine of claim 7, wherein the processor is further configured to control one or more of the angular position of the machine body, the lateral position of the at least one track roller frame assembly and an engaging implement of the tracked machine to block an operator-requested operation based on the parameter for the tracked machine.

13. A method of controlling a tracked machine having a support structure, at least one track roller frame assembly coupled to the support structure and a machine body coupled to the support structure, the method comprising:

detecting, via a lateral position sensor that is coupled to the at least one track roller frame assembly, a lateral position of the at least one track roller frame assembly relative to the support structure;

detecting, via an angular position sensor that is coupled to the machine body, an angular position of the machine body relative to the support structure;

storing, via a memory, a plurality of load table associated with operations of the tracked machine;

determining, via a computing device, a parameter for the tracked machine based on the detected lateral position of the at least one track roller frame assembly and the detected angular position of the machine body, wherein the detected lateral position is indicative of asymmetrical positioning of the at least one track roller frame assembly relative to the machine body, wherein the determining the parameter comprises selecting a load table from the plurality of load tables based on the detected lateral position of the at least one track roller frame assembly and the detected angular position of the machine body; and providing feedback based on the parameter for the tracked machine, wherein the providing the feedback based on the parameter comprises displaying the selected load table on a display device.

14. The method of claim 13, further comprising providing further feedback based on the parameter, the further feedback comprising one or more of:

sounding an alarm based on the parameter and a current operation being performed by the tracked machine; and displaying an indicator based on the parameter and a current operation being performed by the tracked machine.

15. The method of claim 13, further comprising:

detecting, via the angular position sensor, a change in the angular position of the machine body relative to the support structure;

determining an updated parameter for the tracked machine based on the change in angular position of the machine body relative to the support structure and the detected lateral position of the at least one track roller frame assembly; and providing feedback based on the updated parameter for the tracked machine.

16. The method of claim 13, further comprising:

detecting, by the lateral position sensor, a change in the lateral position of the at least one track roller frame assembly relative to the support structure;

determining an updated parameter for the tracked machine based on the change in lateral position of the at least one track roller frame assembly relative to the support structure and the angular position of the machine body relative to the support structure; and providing feedback based on the updated parameter for the tracked machine.

17. The method of claim 13, further comprising:

controlling one or more of the angular position of the machine body, the lateral position of the at least one track roller frame assembly and an engaging implement of the tracked machine to block an operator-requested operation based on the parameter for the tracked machine.

\* \* \* \* \*